(12) United States Patent
Happ et al.

(10) Patent No.: US 11,702,991 B2
(45) Date of Patent: Jul. 18, 2023

(54) TURBOMACHINE SEALING ARRANGEMENT HAVING A HEAT SHIELD

(71) Applicant: General Electric Company, Schenectady, NY (US)

(72) Inventors: Emily Klara Happ, Greenville, SC (US); Lucas John Stoia, Greenville, SC (US)

(73) Assignee: General Electric Company, Schenectady, NY (US)

( * ) Notice: Subject to any disclaimer, the term of this patent is extended or adjusted under 35 U.S.C. 154(b) by 28 days.

(21) Appl. No.: 17/038,312

(22) Filed: Sep. 30, 2020

(65) Prior Publication Data

US 2022/0099030 A1 Mar. 31, 2022

(51) Int. Cl.
*F02C 7/24* (2006.01)
*F01D 25/14* (2006.01)
*F02C 7/28* (2006.01)

(52) U.S. Cl.
CPC .............. *F02C 7/24* (2013.01); *F01D 25/145* (2013.01); *F02C 7/28* (2013.01); *F05D 2240/55* (2013.01); *F05D 2260/231* (2013.01)

(58) Field of Classification Search
CPC ........... F01D 9/023; F01D 11/005; F02C 7/28
See application file for complete search history.

(56) References Cited

U.S. PATENT DOCUMENTS

| | | | |
|---|---|---|---|
| 4,821,522 A * | 4/1989 | Matthews | F01D 9/023 415/175 |
| 4,920,742 A | 5/1990 | Nash et al. | |
| 5,407,319 A * | 4/1995 | Harrogate | F01D 9/023 415/115 |
| 6,071,083 A | 6/2000 | Kakovitch | |
| 6,557,350 B2 | 5/2003 | Farmer et al. | |
| 7,464,554 B2 | 12/2008 | Cheung et al. | |
| 8,079,219 B2 | 12/2011 | Johnson et al. | |
| 9,366,444 B2 * | 6/2016 | Salunkhe | F01D 9/023 |
| 2006/0127219 A1 * | 6/2006 | Zborovsky | F01D 9/023 415/229 |
| 2012/0060503 A1 * | 3/2012 | Schnieder | F01D 9/023 60/752 |

(Continued)

FOREIGN PATENT DOCUMENTS

| | | |
|---|---|---|
| EP | 0344877 B1 | 7/1992 |
| EP | 1258682 A2 | 11/2002 |

*Primary Examiner* — Topaz L. Elliott
*Assistant Examiner* — Cameron A Corday
(74) *Attorney, Agent, or Firm* — Dority & Manning, P.A.

(57) ABSTRACT

Sealing arrangements and turbomachines are provided. A sealing arrangement includes a transition duct having an upstream end and a downstream end. The transition duct includes an aft frame that circumferentially surrounds the downstream end of the transition duct. A first stage nozzle is spaced apart from the aft frame and defines a gap therebetween. A sealing assembly is coupled to the aft frame. The sealing assembly includes a flexible sealing element that extends from the aft frame, across the gap, to the first stage nozzle. The flexible sealing element is forced into sealing engagement with the first stage nozzle by pressure from a compressed working fluid. The sealing assembly further includes a heat shield disposed between the flexible sealing element and the aft frame. The heat shield terminates within the gap.

18 Claims, 5 Drawing Sheets

(56) References Cited

U.S. PATENT DOCUMENTS

2012/0200046 A1* 8/2012 Green ............... F01D 11/02
 277/647
2015/0354386 A1* 12/2015 Chuong ............ F01D 25/30
 415/182.1

* cited by examiner

TURBOMACHINE SEALING ARRANGEMENT HAVING A HEAT SHIELD

FIELD

The present disclosure relates generally to a sealing arrangement for a turbomachine. In particular, the present disclosure relates to an improved sealing arrangement between an aft frame and a first stage turbine nozzle.

BACKGROUND

Turbomachines are utilized in a variety of industries and applications for energy transfer purposes. For example, a gas turbine engine generally includes a compressor section, a combustion section, a turbine section, and an exhaust section. The compressor section progressively increases the pressure of a working fluid entering the gas turbine engine and supplies this compressed working fluid to the combustion section. The compressed working fluid and a fuel (e.g., natural gas) mix within the combustion section and burn in a combustion chamber to generate high pressure and high temperature combustion gases. The combustion gases flow from the combustion section into the turbine section where they expand to produce work. For example, expansion of the combustion gases in the turbine section may rotate a rotor shaft connected, e.g., to a generator to produce electricity. The combustion gases then exit the gas turbine via the exhaust section.

The combustion section of a gas turbine typically includes combustors that are coupled to a stage-one nozzle of the turbine section via transition ducts. Typically, each transition duct has an aft frame positioned adjacent to an inlet side of the turbine section. The aft frame will usually have two arcuate portions which are typically referred to as inner and outer portions, being inner and outer in the radial direction with respect to the centerline axis of the turbine. The inner and outer portions of the aft frame are interconnected by radially extending linear portions, often referred to as side portions. A sealing assembly is typically used to seal between the aft frame and the inlet of the turbine section. In particular, inner and outer circumferential seals are used to seal between the inner and outer portions of the aft frame and the corresponding inlet of the turbine section. Likewise, radially oriented side seals can be disposed between adjacent aft frames to substantially close and seal off the circumferential gaps between the side portion of one aft frame and the next aft frame. The sealing assembly positioned about the aft frame generally functions to prevent high temperature combustion gases from escaping the gas turbine engine prior to entrance into the turbine section.

However, issues exist with the use of many known sealing assemblies. For example, the high temperature of the combustion gases can cause damage to the sealing assembly over time, which may result in a limited life and decreased durability of the assembly. Accordingly, an improved sealing assembly is desired in the art. In particular, an improved sealing assembly for a gas turbine engine that has increased heat protection capabilities, thereby prolonging the overall life and durability of the assembly, is desired.

BRIEF DESCRIPTION

Aspects and advantages of the sealing arrangements and turbomachines in accordance with the present disclosure will be set forth in part in the following description, or may be obvious from the description, or may be learned through practice of the technology.

In accordance with one embodiment, a sealing arrangement is provided. The sealing arrangement includes a transition duct having an upstream end and a downstream end. The transition duct includes an aft frame that circumferentially surrounds the downstream end of the transition duct. A first stage nozzle is spaced apart from the aft frame and defines a gap therebetween. A sealing assembly is coupled to the aft frame. The sealing assembly includes a flexible sealing element that extends from the aft frame, across the gap, to the first stage nozzle. The flexible sealing element is forced into sealing engagement with the first stage nozzle by pressure from a compressed working fluid. The sealing assembly further includes a heat shield disposed between the flexible sealing element and the aft frame. The heat shield terminates within the gap In accordance with another embodiment, a turbomachine is provided. The turbomachine includes a compressor section, a combustor section, and a turbine section. The combustor section having a plurality of combustors. Each combustor includes a transition duct having an upstream end and a downstream end. The transition duct includes an aft frame that circumferentially surrounds the downstream end of the transition duct. The turbine section includes a first stage nozzle that is spaced apart from the aft frame. A gap is defined between the first stage nozzle and the aft frame. The turbomachine further includes a sealing assembly that is coupled to the aft frame. The sealing assembly includes a flexible sealing element that extends from the aft frame, across the gap, to the first stage nozzle. The flexible sealing element is forced into sealing engagement with the first stage nozzle by pressure from a compressed working fluid. The sealing assembly further includes a heat shield disposed between the flexible sealing element and the aft frame. The heat shield terminates within the gap These and other features, aspects and advantages of the present sealing arrangements and turbomachines will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present sealing arrangements and turbomachines, including the best mode of making and using the present systems and methods, directed to one of ordinary skill in the art, is set forth in the specification, which makes reference to the appended figures, in which.

DETAILED DESCRIPTION

Figure 1:
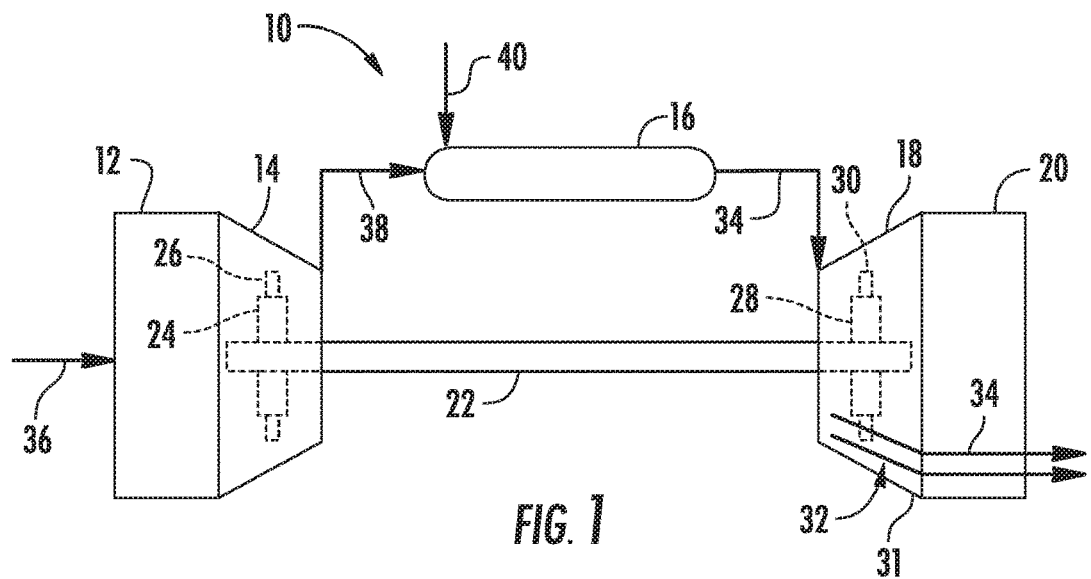
FIG. 1 is a schematic illustration of a turbomachine in accordance with embodiments of the present disclosure.

Reference now will be made in detail to embodiments of the present sealing arrangements and turbomachines, one or more examples of which are illustrated in the drawings. Each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents.

The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components.

As used herein, the terms "upstream" (or "forward") and "downstream" (or "aft") refer to the relative direction with respect to fluid flow in a fluid pathway. For example, "upstream" refers to the direction from which the fluid flows, and "downstream" refers to the direction to which the fluid flows. The term "radially" refers to the relative direction that is substantially perpendicular to an axial centerline of a particular component, the term "axially" refers to the relative direction that is substantially parallel and/or coaxially aligned to an axial centerline of a particular component and the term "circumferentially" refers to the relative direction that extends around the axial centerline of a particular component. terms of approximation, such as "generally," or "about" include values within twenty percent greater or less than the stated value. When used in the context of an angle or direction, such terms include within twenty degrees greater or less than the stated angle or direction. For example, "generally vertical" includes directions within ten degrees of vertical in any direction, e.g., clockwise or counter-clockwise.

Referring now to the drawings, FIG. 1 illustrates a schematic diagram of one embodiment of a turbomachine, which in the illustrated embodiment is a gas turbine 10. Although an industrial or land-based gas turbine is shown and described herein, the present disclosure is not limited to a land based and/or industrial gas turbine unless otherwise specified in the claims. For example, the invention as described herein may be used in any type of turbomachine including but not limited to a steam turbine, an aircraft gas turbine, or a marine gas turbine.

As shown, gas turbine 10 generally includes an inlet section 12, a compressor section 14 disposed downstream of the inlet section 12, a plurality of combustors (not shown) within a combustor section 16 disposed downstream of the compressor section 14, a turbine section 18 disposed downstream of the combustor section 16, and an exhaust section 20 disposed downstream of the turbine section 18. Additionally, the gas turbine 10 may include one or more shafts 22 coupled between the compressor section 14 and the turbine section 18.

The compressor section 14 may generally include a plurality of rotor disks 24 (one of which is shown) and a plurality of rotor blades 26 extending radially outwardly from and connected to each rotor disk 24. Each rotor disk 24 in turn may be coupled to or form a portion of the shaft 22 that extends through the compressor section 14.

The turbine section 18 may generally include a plurality of rotor disks 28 (one of which is shown) and a plurality of rotor blades 30 extending radially outwardly from and being interconnected to each rotor disk 28. Each rotor disk 28 in turn may be coupled to or form a portion of the shaft 22 that extends through the turbine section 18. The turbine section 18 further includes an outer casing 31 that circumferentially surrounds the portion of the shaft 22 and the rotor blades 30, thereby at least partially defining a hot gas path 32 through the turbine section 18.

During operation, a working fluid such as air 36 flows through the inlet section 12 and into the compressor section 14 where the air 36 is progressively compressed, thus providing pressurized air or compressed air 38 to the combustors 17 (FIG. 2) of the combustor section 16. The compressed air 38 is mixed with fuel 40 and burned within each combustor 17 (FIG. 2) to produce combustion gases 34. The combustion gases 34 flow through the hot gas path 32 from the combustor section 16 into the turbine section 18, wherein energy (kinetic and/or thermal) is transferred from the combustion gases 34 to the rotor blades 30, causing the shaft 22 to rotate. The mechanical rotational energy may then be used to power the compressor section 14 and/or to generate electricity. The combustion gases 34 exiting the turbine section 18 may then be exhausted from the gas turbine 10 via the exhaust section 20.

Figure 2:
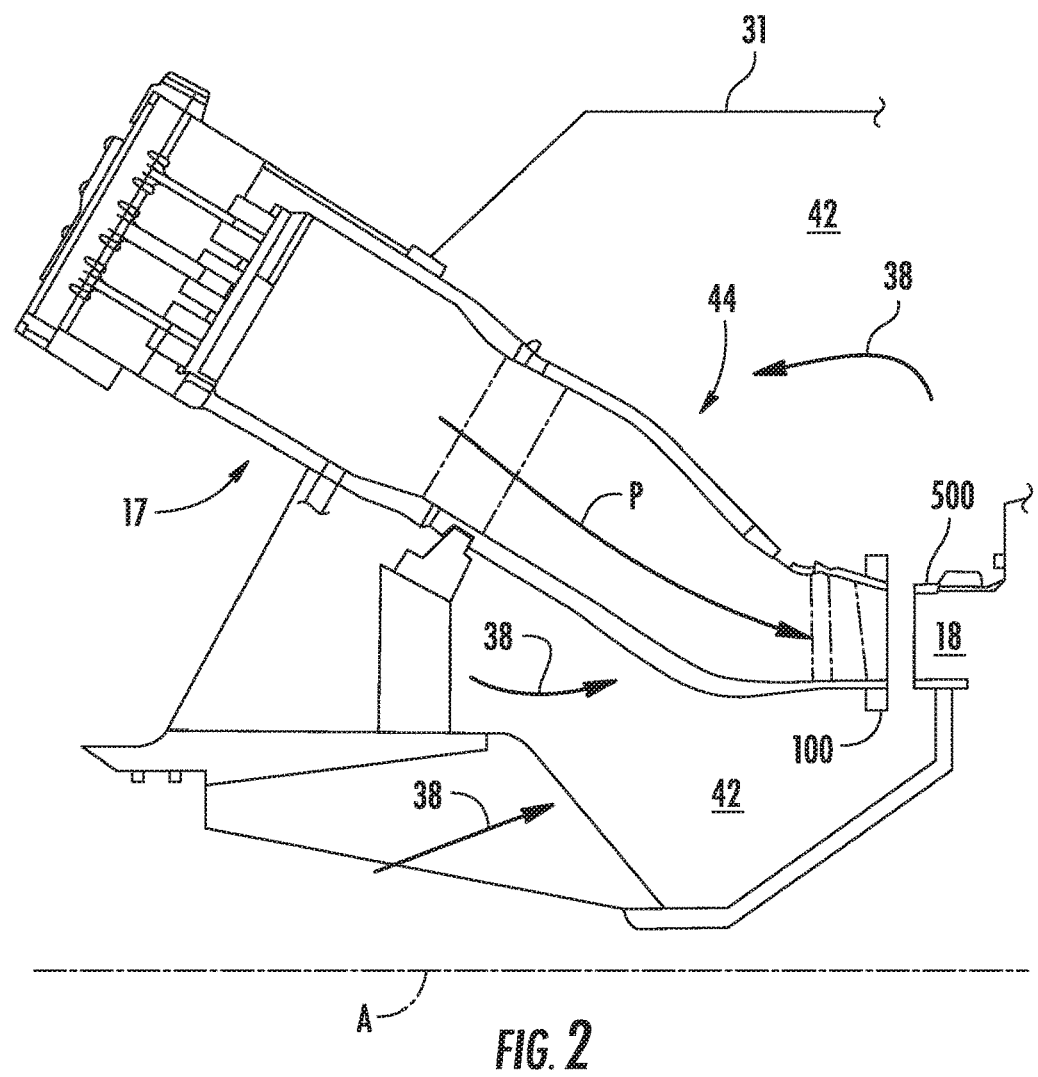
FIG. 2 illustrates a section view of a combustor in accordance with embodiments of the present disclosure.

As shown in FIG. 2, a combustor 17 may be at least partially surrounded by an outer casing 31 such as a compressor discharge casing. The outer casing 31 may at least partially define a high-pressure plenum 42 that at least partially surrounds various components of the combustor 17, such as transition duct 44. The high-pressure plenum 42 may be in fluid communication with the compressor 14 (FIG. 1) so as to receive the compressed air 38 therefrom. As illustrated in FIG. 2, the combustor 17 may be connected to a stage-one nozzle 500 of turbine 18 via a transition duct 44 including an aft frame 100. The transition duct 44 defines a flow path P. Also shown in FIG. 2 is the central axis A of turbine 18, which defines an axial direction substantially parallel to and/or along axis A, a radial direction R (FIG. 3) perpendicular to axis A, and a circumferential direction C (FIG. 3) extending around axis A.

Figure 3:
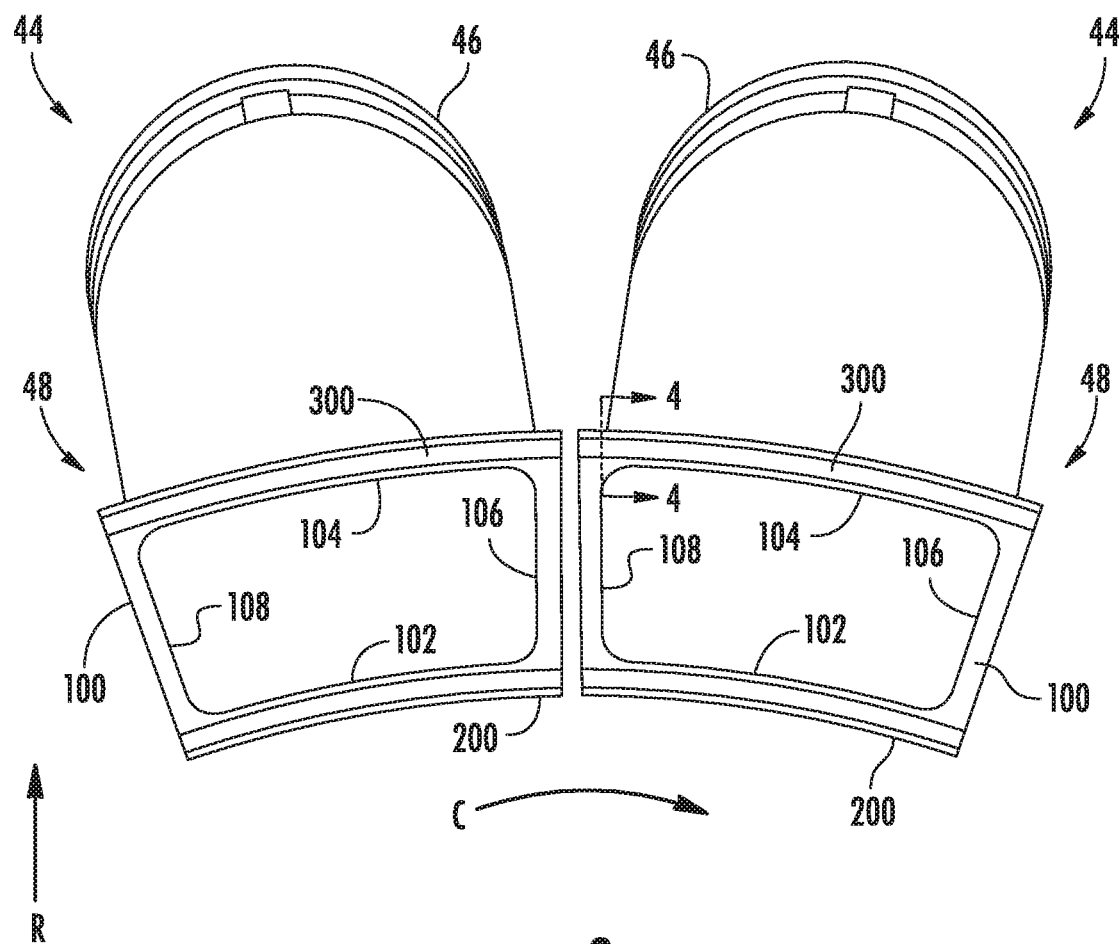
FIG. 3 illustrates a perspective view of circumferentially adjacent transition ducts in accordance with embodiments of the present disclosure.
Figure 4:
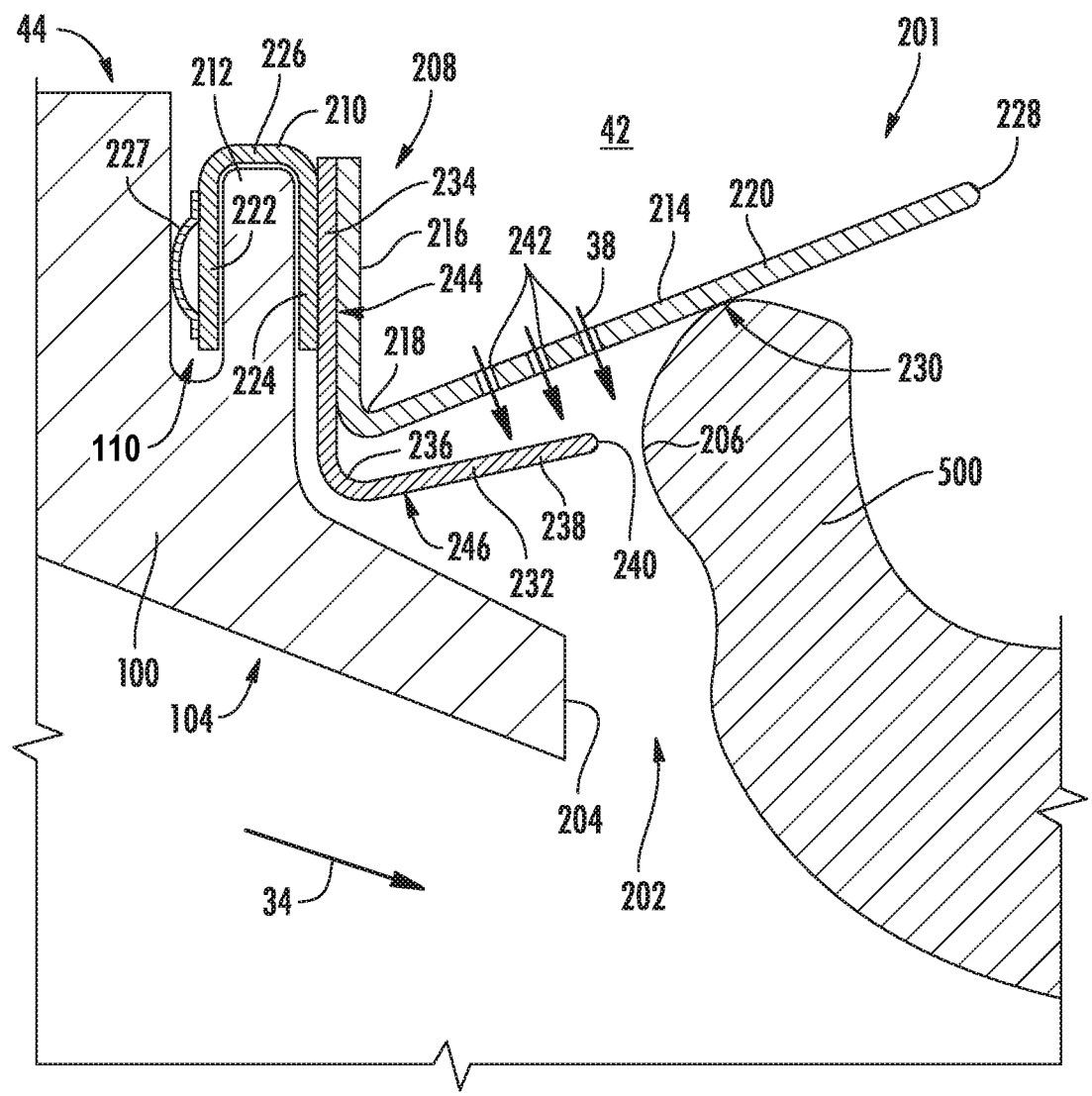
FIG. 4 illustrates a cross sectional perspective view of a sealing arrangement in accordance with embodiments of the present disclosure.

Referring now to FIG. 3, a pair of circumferentially arranged transition ducts 44 are illustrated, each having an upstream end 46 and a downstream end 48. As shown, an aft frame 100 surrounds the respective downstream end 48 of the transition ducts 44. As illustrated in FIG. 3, in some embodiments, the aft frame 100 may have an inner portion 102 and an outer portion 104, with a pair of opposing side portions 106 and 108 that extend radially between the inner and the outer portions 102 and 104. Also illustrated in FIG. 3 is an inner seal 200 and an outer seal 300 respectively disposed on the inner portion 102 and outer portion 104 of each aft frame 100. Aft frame 100 may include a notch or slot 110 (as shown in FIG. 4) for receiving inner seal 200 and/or outer seal 300. In some embodiments, a notch 110 may extend fully around the perimeter of the aft frame 100 (e.g., notch 110 may be continuous through the side portions 106 and 108 and the inner and the outer portions 102 and 104) for receiving both inner seal 200 and outer seal 300 as well as a radially-oriented side seal (not shown) which may be provided between adjacent aft frames 100. It is also possible in some embodiments to provide separate slots or notches for each of the seals 200 and 300.

As shown in FIG. 3, inner seal 200 and outer seal 300 may be circumferentially oriented with respect to a circumferential direction C of the gas turbine 10. For example, each inner seal 200 is circumferentially aligned with the other inner seal 200 on the adjacent aft frame 100, and each outer seal 300 is circumferentially aligned with the other outer seal 300 on the adjacent aft frame 100. Thus, inner seals 200 and outer seals 300 may be collectively referred to as circumferentially oriented seals.

In the description herein, certain features of the aft frame 100, stage-one nozzle 500, and seals, 200 and 300 will be described with reference to one or the other of inner portion 102/inner seal 200 and outer portion 104/outer seal 300, nonetheless, it will be recognized by one of ordinary skill in the art that such features can be associated with either or both of inner portions 102 and/or outer portions 104.

FIG. 4 illustrates a cross-sectional view of an exemplary sealing arrangement 201 in accordance with embodiments of the present disclosure. As shown in FIG. 4, the sealing arrangement 201 includes a transition duct 44 having an upstream end 46 and a downstream end 48 (As shown in FIG. 3). In many embodiments, an aft frame 100 circumferentially surrounds the downstream end 48 of the transition duct 44. A first stage nozzle 500 of turbine 18 may be spaced apart from the aft frame 100 and may define a gap 202 between the first stage nozzle 500 and the aft frame 100. Specifically, the first stage nozzle 500 and the aft frame 100 may be axially spaced apart to allow for movement and/or thermal expansion of the first stage nozzle 500 and/or the aft frame 100 during operation of the gas turbine 10. The gap 202 may be defined axially between an aft face 204 of the aft frame 100 and a forward face 206 of the first stage nozzle 500.

As shown in FIG. 4, the sealing arrangement 201 may further include a sealing assembly 208 that couples to the aft frame 100 via the notch 110. In various embodiments, the sealing assembly 208 may be the outer seal 300 discussed herein. The sealing assembly 208 may extend entirely along the outer portion 104 and/or the inner portion 102 of the aft frame 100, i.e. in the circumferential direction C (FIG. 3). In many embodiments, the sealing assembly 208 may be an outer seal 300 and/or an inner seal 200. As shown in FIG. 4, the sealing assembly 208 may be secured to the aft frame via a U-shaped bracket 210 extends into the notch 110 and around a support member 212. As shown, the support member 212 may extend radially outward from the aft frame and into the U-shaped bracket 210, such that the U-shaped bracket 210 is entirely in contact with the support member 212 and secured to the aft frame 100 via the support member 212. In many embodiments, the U-shaped bracket 210 includes a forward portion 222 that extends generally radially, an aft portion 224 that is spaced apart from the forward portion 222 and extends generally radially, and a middle portion 226 that extends generally axially between the forward portion 222 and the aft portion 224. In some embodiments, the sealing arrangement 200 may include a seal 227, such as a D-seal or other suitable seal, that is coupled to the forward portion 222 of the U-shaped bracket 210. The seal 227 may be disposed between the notch 110 and the forward portion 222 of the U-shaped bracket 210, such that the seal 227 biases the U-shaped bracket 210 against the support member 212 of the aft frame 100.

A flexible sealing element 214 may extend from the aft frame 100, across the gap 202, to the first stage nozzle 500. The flexible sealing element 214 may be composed primarily of a cloth material, which can be a woven mesh cloth of a suitable metal material, e.g., alloy L605. The materials of the flexible sealing element 214 may be layered, e.g., a single sheet of cloth material may be folded over on itself as illustrated in FIG. 4, and/or multiple layers of cloth material may be welded together.

As shown in FIG. 4, the flexible sealing element 214 may include a first portion 216 that extends generally radially, a bend 218, and a second portion 220 that extends generally axially. The flexible sealing element 214 may be one continuous metal sheet, segmented metal sheets, and/or metal woven cloth that extends between the first portion 216, the bend 218, and the second portion 220 without any breaks, joints, and/or seams. In some embodiments, the first portion 216 of the flexible sealing element 214 may be coupled to, and extend from, the U-shaped bracket 210. More specifically, the first portion 216 of the flexible sealing element 214 may be coupled to the aft portion 224 of the U-shaped bracket 210. In other embodiments (not shown), the flexible sealing element 214 may extend continuously from the U-shaped bracket 210, such that the U-shaped bracket 210 and the flexible sealing element 214 are one integral component. As shown, the flexible sealing element 214 may be spaced apart from the aft frame 100 by the U-shaped bracket, such that the flexible sealing element 214 does not contact the aft frame 100. The bend 218 may be disposed at the intersection of the first portion 216 and the second portion 220 and may transition the flexible sealing element 214 from a generally radial orientation to a generally axial orientation with respect to the axial centerline A of gas turbine 10.

The second portion 220 of the flexible sealing element 214 may extend directly from the bend 218 to a free end 228. In many embodiments, the second portion 220 of the flexible sealing element 214 may terminate at the free end 228. In various embodiments, as shown in FIG. 4, the second portion 220 of the flexible sealing element 214 may diverge radially outwardly with respect to the axial centerline of the gas turbine 10 as it extends from the bend 218 to the free end 228. The second portion 220 of the flexible sealing element 214 may be in contact with a radially outer surface 230 of the first stage nozzle 500 at a location defined between the bend 218 and the free end 228. In many embodiments, the flexible sealing element 214 may be forced into sealing engagement with the first stage nozzle 500 by pressure from a compressed working fluid, such as the compressed air 38 (FIG. 2). More specifically, the pressure from the compressed air 38 within the high pressure plenum 42 may force the second portion 220 of the flexible sealing element 214 to sealingly engage with the outer surface 230 of the first stage nozzle 500, which advantageously prevents combustion gases 34 from escaping when transitioning from the aft frame 100 to the first stage nozzle 500.

As shown in FIG. 4, the sealing assembly 208 may further include a heat shield 232 that extends generally parallel to the flexible sealing element 214 and terminates within the gap 202. The heat shield 232 may function to advantageously prevent combustion gases 34 exiting the aft frame 100 from causing thermal damage to the flexible sealing element 214. For example, the heat shield 232 minimizes the contact between the high temperature combustion gases 34 and the flexible sealing element 214, which prolongs the life and durability of the flexible sealing element 214.

In many embodiments, the heat shield 232 may include a first portion 234 that extends generally radially, a bend 236, a second portion 238 that extends generally axially, an outer surface 244, and an inner surface 246. In some embodiments, the first portion 234 of the heat shield 232 may be coupled to, and extend from, the U-shaped bracket 210. More specifically, the first portion 234 of the heat shield 232 may be coupled to the aft portion 224 of the U-shaped bracket 210. In many embodiments, as shown, the first portion 234 of the heat shield 232 may be positioned axially between the aft portion 224 of the U-shaped bracket 210 and the first portion 216 of the flexible sealing element 214. In other embodiments (not shown), heat shield 232 may extend continuously from the U-shaped bracket 210, such that the U-shaped bracket 210 and the heat shield 232 are one integral component. In many embodiments, the outer surface 244 of the heat shield 232 may be in contact the first portion 216 of the flexible sealing element 214 and the inner surface 246 of the heat shield 232 may be in contact with the aft portion 224 of the U-shaped bracket 210.

As shown FIG. 4, the heat shield 232 may be spaced apart from the aft frame 100 by the U-shaped bracket 210, such that the heat shield 232 does not contact the aft frame 100. The bend 236 may be disposed at the intersection of the first portion 232 and the second portion 238 and may transition the heat shield 232 from a generally radial orientation to a generally axial orientation with respect to the axial centerline A of gas turbine 10. As shown, the first portion 234 of the heat shield 232 may be longer than the first portion 216 of the flexible sealing element, such that a space is created between the bends 218, 236 and the second portions 220, 238.

The second portion 238 of the heat shield 232 may extend directly from the bend 236 to a free end 240. In many embodiments, the second portion 238 of the heat shield 232 may be shorter than the second portion 220 of the flexible sealing element 214, as a result the free end 240 may be disposed within the gap 202. For example, the free end 240 may be disposed axially between the aft face 204 of the aft frame 100 and the forward face 206 of the first stage nozzle 500. The second portion 238 of the heat shield 232 may terminate at the free end 240. In various embodiments, as shown in FIG. 4, the second portion 238 of the heat shield 232 may diverge radially outwardly with respect to the axial centerline of the gas turbine 10 as it extends from the bend 236 to the free end 240. Further, as shown, the second portion 238 of the heat shield 232 and the second portion 220 of the flexible sealing element 214 may diverge radially away from one another as they each extend axially towards the first stage nozzle 500, i.e., from their respective bends 218, 236 to respective free ends 228, 240. For example, the distance between the second portions 220, 238 may increase in the downstream direction (from left to right on FIG. 4), i.e., the second portions 220, 238 may gradually taper away from one another in the downstream direction.

As shown in FIG. 4, the flexible sealing element 214 may further define a plurality of cooling holes 242. More specifically, the plurality of cooling holes 242 may be defined within the second portion 220 of the flexible sealing element 214 and oriented towards the outer surface 244 of the second portion 220 of the heat shield 232. The plurality of cooling holes 242 may function to advantageously direct compressed working fluid, e.g. compressed air 38 from the high-pressure plenum 42, onto the outer surface 244 of the heat shield 232 to both cool the heat shield 232 and purge the combustion gases 34 from the gap 202.

Figure 5:
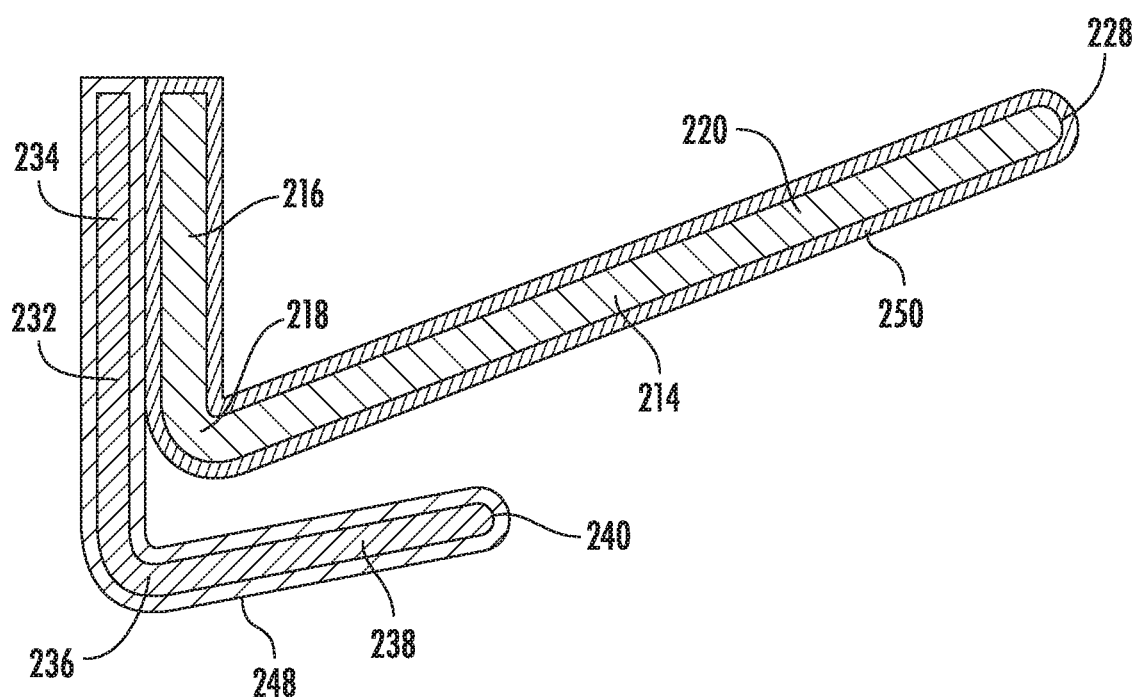
FIG. 5 illustrates a simplified cross-sectional view of a flexible sealing element and a heat shield isolated from the other components of a sealing assembly in accordance with embodiments of the present disclosure.

FIG. 5 illustrates a simplified cross-sectional view of the flexible sealing element 214 and the heat shield 232 isolated from the other components of the sealing assembly 200. As shown, the heat shield 232 may be coated in a thermal barrier coating 248 to provide increased thermal protection, part life, and part durability to both the heat shield 232 and the flexible sealing element 214 during operation of the gas turbine 10. Additionally or alternatively, in some embodiments, a second thermal barrier coating 250 may be disposed around the outer surface of the flexible sealing element 214. The thermal barrier coating may be a ceramic coating or other suitable material disposed on the outer surface of the heat shield 232, e.g. the thermal barrier coating may be yttria-stabilized zirconia (YSZ), mullite, alumina, or any other suitable material.

Figure 6:
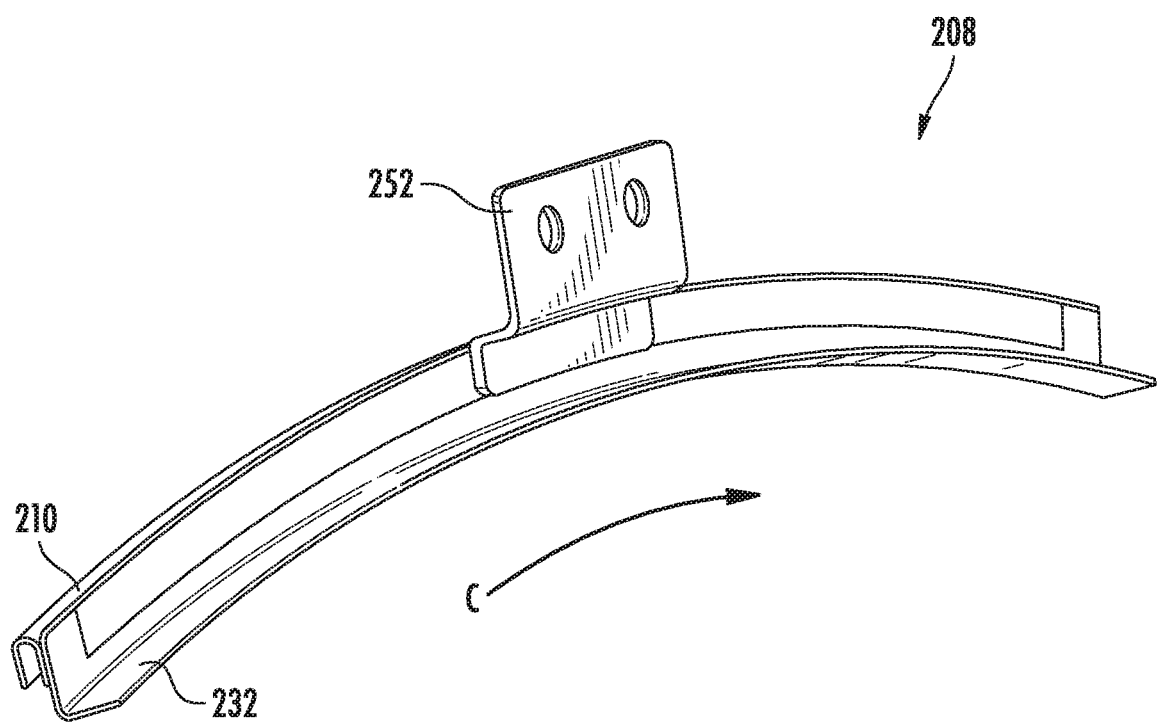
FIG. 6 illustrates a perspective view of a sealing assembly without a flexible sealing element in accordance with embodiments of the present disclosure.

FIG. 6 illustrates a perspective view of the sealing assembly 208 without the flexible sealing element 214 in place. As shown, the sealing assembly 208 may extend in the circumferential direction C and may be generally arcuate. In many embodiments, the sealing assembly may have the same curved shape and/or profile as the outer portion 104 and/or the inner portion 102 of the aft frame 100 in order to fully couple to the aft frame 100 (as shown in FIG. 3). The sealing assembly 208 may further include a flange 252 that may be bolted or otherwise coupled to the aft frame 100, in order to further secure the sealing assembly 208 to the aft frame 100.

Referring back to FIG. 4, in operation of the gas turbine 10, combustion gases 34 flow through the transition duct of combustor 17 and exit at the aft frame 100. At which point, the combustion gases transition from the combustor 17 to the inlet of the turbine section 18 at the first stage nozzle 500. The flexible sealing element 214 may be disposed between the aft frame 100 and the first stage nozzle 500 to ensure that no combustion gases 34 escape during the transition into the turbine section 18. The flexible sealing element 214 is advantageously protected from the high heat of the combustion gases 34 by the heat shield 232. For example, the heat shield 232 provides the flexible sealing element 214 with a protective barrier from the high temperature combustion gases 34. This advantageously improves the life of the flexible sealing element 214, increases its durability, and decreases its risk of thermal damage.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A sealing arrangement for a turbomachine, the turbomachine defining an axial centerline, the sealing arrangement comprising:
   a transition duct having an upstream end and a downstream end, the transition duct comprising an aft frame that circumferentially surrounds the downstream end of the transition duct;

a first stage nozzle spaced apart from the aft frame and defining a gap therebetween, the first stage nozzle defining a forwardmost face; and a sealing assembly coupled to the aft frame, the sealing assembly comprising:

a flexible sealing element extending from the aft frame across the gap to the first stage nozzle, wherein the flexible sealing element is forced into sealing engagement with the first stage nozzle by pressure from a compressed working fluid; and a heat shield disposed between the flexible sealing element and the aft frame, wherein the heat shield is spaced apart from the first stage nozzle, such that the heat shield terminates upstream of the forwardmost face and within the gap, wherein the flexible sealing element and the heat shield each include a first portion that extends generally radially, a bend, a second portion, and a free end, and wherein the second portion of the flexible sealing element and the heat shield each radially diverge away from the axial centerline from the respective bend to the respective free end.

2. The sealing arrangement as in claim 1, wherein the heat shield is coated in a thermal barrier coating.

3. The sealing arrangement as in claim 1, wherein the second portion of the flexible sealing element comprises a plurality of cooling holes configured to direct the compressed working fluid onto an outer surface of the heat shield to cool the heat shield and purge combustion gases from the gap, and wherein the second portion of the heat shield is spaced apart from the first stage nozzle and the flexible sealing element.

4. The sealing arrangement as in claim 1, wherein the first portion of the flexible sealing element and the first portion of the heat shield are at least partially in contact with one another.

5. The sealing arrangement as in claim 1, wherein the second portion of the flexible sealing element and the second portion of the heat shield radially diverge from one another as the respective second portions extend from the respective bend to the respective free end.

6. The sealing arrangement as in claim 1, wherein the first portion of the heat shield is longer than the first portion of the flexible sealing element, and wherein the second portion of the flexible sealing element is longer than the second portion of the heat shield.

7. The sealing arrangement as in claim 1, wherein the aft frame comprises an outer portion, an inner portion, a first side portion extending between the outer portion and the inner portion, and a second side portion extending between the outer portion and the inner portion.

8. The sealing arrangement as in claim 7, wherein the outer portion of the aft frame defines a notch and a support member.

9. The sealing arrangement as in claim 8, wherein the sealing assembly further comprises a U-shaped bracket that extends into the notch and couples to the support member, and wherein the heat shield is connected to the U-shaped bracket.

10. A turbomachine defining an axial centerline, the turbomachine comprising:

a compressor section;

a combustor section having a plurality of combustors, each combustor comprising a transition duct having an upstream end and a downstream end, the transition duct comprising an aft frame that circumferentially surrounds the downstream end of the transition duct;

a turbine section having a first stage nozzle spaced apart from the aft frame, the first stage nozzle defining a forwardmost face, wherein a gap is defined between the forwardmost face of the first stage nozzle and the aft frame; and a sealing assembly extending circumferentially along the aft frame and coupled to the aft frame, the sealing assembly comprising:

a flexible sealing element extending from the aft frame across the gap to the first stage nozzle, wherein the flexible sealing element is forced into sealing engagement with the first stage nozzle by pressure from a compressed working fluid from the compressor section; and a heat shield disposed between the flexible sealing element and the aft frame, wherein the heat shield is spaced apart from the first stage nozzle, such that the heat shield terminates upstream of the forwardmost face and within the gap, wherein the flexible sealing element and the heat shield each include a first portion that extends generally radially, a bend, a second portion, and a free end, and wherein the second portion of the flexible sealing element and the heat shield each radially diverge away from the axial centerline from the respective bend to the respective free end.

11. The turbomachine as in claim 10, wherein the heat shield is coated in a thermal barrier coating.

12. The turbomachine as in claim 10, wherein the second portion of the flexible sealing element comprises a plurality of cooling holes configured to direct compressed working fluid onto an outer surface of the heat shield to cool the heat shield and purge combustion gases from the gap, and wherein the second portion of the heat shield is spaced apart from the first stage nozzle and the flexible sealing element.

13. The turbomachine as in claim 10, wherein the first portion of the flexible sealing element and the first portion of the heat shield are at least partially in contact with one another.

14. The turbomachine as in claim 10, wherein the second portion of the flexible sealing element and the second portion of the heat shield radially diverge from one another as the respective second portions extend from the respective bend to the respective free end.

15. The turbomachine as in claim 10, wherein the first portion of the heat shield is longer than the first portion of the flexible sealing element, and wherein the second portion of the flexible sealing element is longer than the second portion of the heat shield.

16. The turbomachine as in claim 10, wherein the aft frame comprises an outer portion, an inner portion, a first side portion extending between the outer portion and the inner portion, and a second side portion extending between the outer portion and the inner portion.

17. The turbomachine as in claim 16, wherein the outer portion of the aft frame defines a notch and a support member.

18. The turbomachine as in claim 17, wherein the sealing assembly further comprises a U-shaped bracket that extends into the notch and couples to the support member, and wherein the flexible sealing element and the heat shield are connected to the U-shaped bracket.

* * * * *